Figure 1:
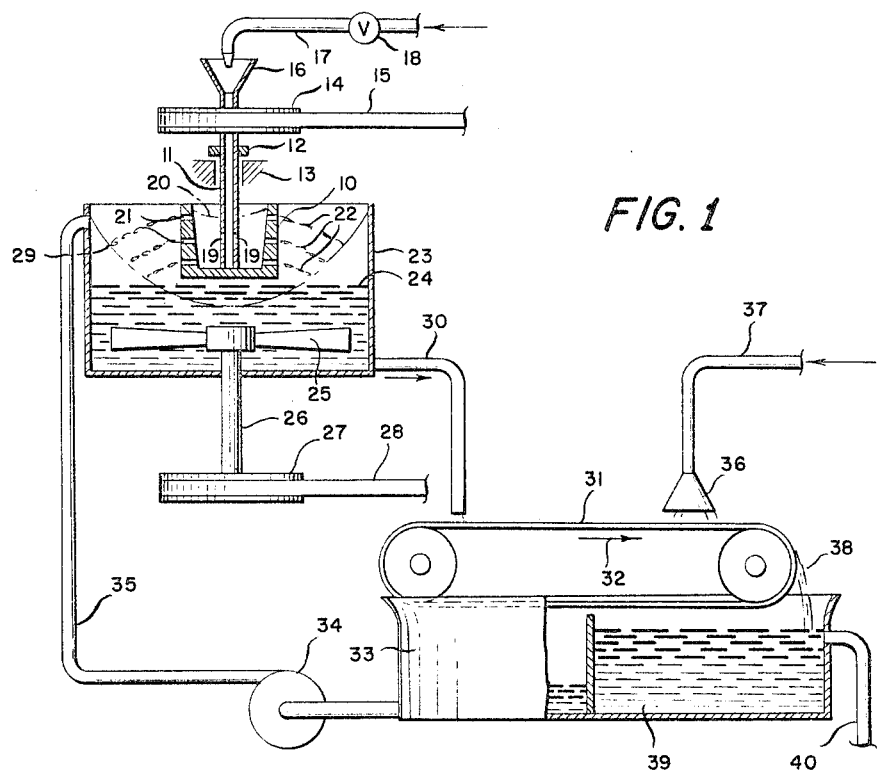

Sept. 13, 1966  S. MOGENSEN  3,272,893

METHOD FOR THE PRODUCTION OF FLUID PEARLS

Filed Feb. 25, 1963

INVENTOR

STEN MOGENSEN

BY *Larson and Taylor*

ATTORNEYS 3,272,893
METHOD FOR THE PRODUCTION OF
FLUID PEARLS
Sten Mogensen, Djursholm, Sweden, assignor to
AGA Aktiebolag, a corporation of Sweden
Filed Feb. 25, 1963, Ser. No. 260,615
Claims priority, application Sweden, Mar. 19, 1962,
3,033/62
4 Claims. (Cl. 264—8)

This invention relates to a method for the production of fluid pearls. Fluid pearls in this connection are small, preferably spherically round, pearl-form bodies, containing a shell which is thin, rigid and impervious to fluid, and in the interior of the pearl is a fluid. The fluid preferably comprises water or a water solution of salts, but may also consist of a gel of a suitable kind, which has consumed an essential quantity of fluid. Such fluid pearls are used as an addition to plastic materials of different kinds, to concrete, to plaster, to clay, and so on, in order to make such materials porous. The fluid pearls are intermixed evenly into the material to be made porous, where they will dry after a short period of time, leaving pores, the dried-out remainder having a very unessential weight and mass.

It has been proposed to produce fluid pearls for addition to plastic materials, concrete, plaster, clay or the like, by preforming a solution of the substance forming the fluid pearls, which is preferably a gel-forming material, into substantially spherical bodies which are thereafter brought down into a curing bath which reacts in such a way with the material forming the fluid pearls that these form the said shell, and so that the drops are therefore cured, forming fluid pearls.

As raw material for the fluid pearls, preferably diluted alginic acid or a salt thereof is used, for instance, sodium alginate in a solution, and the curing bath thereby suitably consists of a solution of a calcium salt, for instance, calcium chloride. When the drops of the alginic acid solution or the alginate solution get in contact with the calcium salt solution, calcium alginate is precipitated in the form of a skin or a shell, so that the pearls are formed, and eventually all of the drop is penetrated whereby the ions forming soluble salts are exchanged against such ions which form insoluble salts. Thereby the pearls get strong and resistant. Other gel forming materials which may be used consist of water soluble or alkali soluble cellulose derivatives such as carboxymethyl cellulose, methyl cellulose, hydroxyethyl cellulose, cellulose, agar-agar, amylaceous substances, caseins, bone glue, different kinds of rubber, polyvinyl alcohol and so on. The curing bath used for the purpose of course is dependent upon what material is used as raw material for forming the fluid pearls.

For the production of such fluid pearls it has been proposed to create a beam of the fluid forming the fluid pearls, said beam being divided into pieces by means of separate cutting means or shearing means, said pieces being intended each to form one fluid pearl, and these pieces have, directly in connection with the cutting-off, been moved out into the curing bath. However, it has been found, that one will in this way get fluid pearls which are not very exact. Firstly, they do not become spherical, but rather they assume the form of quite irregular bodies, and secondly one can not obtain fluid pearls of a reasonably unitary size. To this add that one also cannot with the method described, obtain fluid pearls of a very small diameter, which are, however, required for certain specific purposes.

It has also been proposed to form drops of the material forming the fluid pearls, said drops having been dropped down into the curing bath. This method for the production of the fluid pearls also produces pearls which are not sufficiently small for the specific purposes.

One such purpose is, for instance rendering porous the stone-like mass in a gas container containing acetone, and intended to receive acetylene or other gases which are soluble in acetone or some similar fluid medium. Such masses usually are formed from a cement-like material or from pure cement eventually mixed up with other materials, whereby care is taken to use a very great surplus of water. Due to said great surplus of water a strongly developed porosity is obtained when heating and curing the mass, but unfortunately this porosity is so fine that it limits the quantities of gas which can be contained by the gas container. In order to make it possible rapidly to remove large quantities of gas from the gas container, it is therefore necessary to combine with this finely porous system a second rather incompletely developed but coarsely porous system, in which sufficient quantities of gas can be accumulated to correspond to the greater need. This coarsely porous system has amongst others been proposed to be provided by introducing fluid pearls into a mass of the above indicated kind. Then, however, it is necessary that the fluid pearls are small. The suitable order of magnitude is between 0.1 mm. and 1 mm. of diameter. If the fluid pearls are larger, then the cavities will also be larger, and then there would be a risk of explosion by decomposition of the acetylene.

It has also been proposed in producing small fluid pearls to add the material forming the fluid to a vessel which is kept in rotation about a substantially vertical axis, and which is provided with openings adapted to the intended size of the fluid pearls in such a way, that the material forming the fluid pearls is thrown out through said openings in a direction with an essential horizontal component of movement. To this rotating vessel a second vessel is connected, containing a curing bath, and arranged at such a level that the upper surface of the curing bath is so far below the rotational level of the rotating vessel that the particles of the fluid pearl forming material are thrown out in parabolas and approach the surface of the curing bath along such parabolas during a sufficiently long period of time that a pre-sizing of the particles concerned due to surface tension should take place to a substantially spherical form. The surface of the fluid bath, of course, must not be situated so far below the rotational level of the rotating vessel that an excessive vertical component of movement is obtained by the drops forming the fluid pearls, because in such a case these would fall onto the surface of the curing bath with such a power that they would split. Thus, for each separate case a given minimum measure or a given maximum measure between the rotational level of the rotating vessel, on the one hand, and the upper surface of the curing bath, on the other hand, is stipulated, dependent upon what kind of curing bath is used and what material is used as raw material for the fluid pearls.

The smaller the fluid pearls to be produced are, the quicker the rotating vessel has to rotate in order that the fluid pearls should be thrown out with a sufficiently great speed in order that the beam should be divided into sufficiently small pearls.

Due to the high rotational component of movement of the fluid pearls, however, it occurs, that these are split against the surface of the curing bath, or eventually that they will slide or roll over the surface of the curing bath, the last mentioned occurring of course if they hit the surface of the curing bath at an angle which rather essentially differs from the straight angle. If the drops are split agains the surface of the curing bath, one will only get a fine dust, which is not suitable for the purpose indicated above, and if the drops are allowed to slide or roll over the surface of the curing bath before they dip down into the curing bath then the drops are essentially deformed. Therefore, it is important that the drops hit the surface of the curing bath at an approximately straight angle, and also that they hit the surface of the curing bath with a rather low speed, and finally, that the drops, as far as possible, should have obtained an increased surface tension when hitting the surface of the curing bath.

The present invention relates to a method for the production of fluid pearls, using a rotating body to which the material forming the fluid pearls is fed in fluid form. The rotating body is provided with orifices sized according to the dimension of the desired pearls, so that the fluid pearl forming liquid is thrown out through said orifices in the form of drops into an atmosphere, through which the drops pass until they hit the fluid surface in a curing bath existing in a second vessel, where the fluid pearls are subjected to curing, preferably surface curing. According to the invention the orifices in the wall of the rotating vessel are inclined in such a way that the drops from the fluid pearl forming liquid pressed out through them obtain a direction of movement which has a component in opposite direction to the surface rotational direction of the rotating body.

Preferably there is provided around the rotating body a closed vessel containing the curing fluid, but above said curing fluid hot air or other hot gas should be provided, so that when the drops pass through this gaseous atmosphere a given evaporation on the surface of the drops will take place. Thereby the concentration in the surface layer of the drops is increased, and simultaneously the surface tension increases. The increasing surface tension in combination with the above indicated circumstances causes an increased security against the drops being deformed or split.

Figure 2:
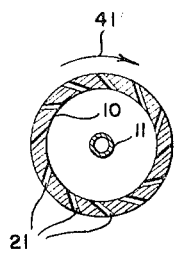

The invention will be further described in connection with the attached drawing, in which FIG. 1 shows a schematic sketch of a system for the production of fluid pearls according to the present invention, whereas FIG. 2 shows a section in enlarged scale of the rotating vessel.

In the arrangement of FIG. 1 the rotating vessel 10 is connected to a hollow shaft 11, which, by means of a flange 12, rests on a support bearing 13. The shaft 11 is provided with a belt disc 14 which by means of the belt 15 and a motor (not shown) is rotated at appropriate speeds. In the prolongation upwardly of shaft 11 a funnel 16 is provided into which a feeder pipe 17 conducts the fluid, which should form the basic material for the fluid pearls, from a vessel (not shown) by way of a valve 18, by means of which the quantity of fluid can be controlled. The shaft 11 is provided with openings 19 through which fluid is fed to the vessel 10 so that this fluid will obtain a suitable level 20.

In the rotating vessel 10 orifices are made in the wall. These orifices are dimensioned according to the size of pearls which one wants to produce. Through said orifices 21 thus, due to the centrifugal force, drops of the liquid are thrown out along paths 22, and should hit the surface 29 of the curing bath, however, only after they have moved through the air during a predetermined period of time.

FIG. 2 shows a section of the rotating centrifugal body 10 and shows particularly how the orifices 21 run in inclined directions relative to the radial direction of the centrifugal body. The orifices 21 in the wall of the centrifugal body 10 thus are inclined in such a way that the drops of the fluid pearl-forming liquid pressed out through them will have imported a direction of movement which has a component in opposite direction relative to the surface rotational direction 41 of the centrifugal body 10.

The speed of movement of said drops, measured in relation to each separate point of the outer surface of the centrifugal body 10, for instance the mouth of each separate orifice in which the drop is created, thus will be high when the drop leaves the centrifugal body, which causes in its turn that the proper drop will be small. It will be remembered that when a beam is divided into drops, then the drops are smaller the higher is the speed of the beam.

On the other hand, the speed of the drop relative to each separate particle on the surface 29 of the fluid bath will get smaller, because the drop is thrown out in a direction with a tangential component opposite to the rotational direction 41 of the rotational body 10.

Of course, it can not be avoided that the drop will nevertheless get a component of movement in the direction 41, but this will be much smaller than the peripheral speed of the rotational body 10. If now the liquid in the vessel 23 is kept in rotation, then the separate particles of the liquid representing the surface 29 will also rotate, and preferably they will rotate in the same direction as the rotational body 10, that means in the direction of the arrow 41, but with a very much smaller speed. The consequence of this will be that the drops thrown out from the rotating body 10, when hitting the liquid surface 29, have a movement which can be divided up into two different components, viz. a first component, which is approximately perpendicular to the liquid surface 29, and a second component, which is tangential to the liquid surface 29, but substantially is compensated for by an approximately even great component of movement of the particles in the liquid surface 29.

Of course, one can provide for the vessel 23 receiving the curing liquid at a standstill, whereby this vessel will have an upper surface 24. From the above indicated reasons, however, it is preferred that the liquid in the vessel 23 should rotate, so that it obtains an upper surface 29. For this purpose in the present case the liquid in the vessel 23 is rotated by means of a wing wheel 25 mounted on a shaft 26, which, by means of a belt disc 27 and a belt 28, is driven from a motor (not shown). In this way the upper surface 24 will, due to the centrifugal force, form itself into a mainly paraboloidic surface 29, which will, with the parts where drops 22 attack the surface, be substantially perpendicular to the paths 22 of the drops.

It is important, that the liquid bath in the curing vessel 23 should be kept at a substantially constant quantity simultaneously as the pearls are removed. Therefore an outlet piping 30 is provided at a place in the wall of the curing vessel 23, to which the fluid pearls together with the curing liquid are driven due to the centrifugal force. The piping 30 leads to a perforated band 31, which is driven in the direction of the arrow 32 by means of driving means (not shown). The perforated band has such fine mesh, that the pearls remain on said band, whereas the curing liquid moves through the band to a collection vessel 33, from which it is brought back to the curing liquid vessel 23 by means of a pump 34 and a return conduit 35.

Due to the movement of the perforated band 31 in the direction of the arrow 32 the pearls will successively pass below a shower 36 fed from a water conduit 37. Here the pearls are washed so that the surfaces of the pearls are as far as possible made free from remaining liquid, which has not gotten into reaction. In a stream 38 the pearls thereafter fall down into a vessel 39, where washing liquid also is present. For removing the washing liquid from the vessel 39 there is provided an edge outflow piping 40.

The described arrangement functions in the following way:

The liquid which shall form the fluid pearls, for instance sodium alginate in solution, is fed through the valve 18 in a controlled amount, and through the pipe 17 and the funnel 16 and the hollow shaft 11 it moves to the centrifugal body 10. Due to the centrifugal force the liquid is thrown out in the form of drops through the orifices 21, so that these drops will follow the paths 22. From the mouth of the orifices 21 until the drops hit the liquid surface 29 they will assume a very well adapted spherical form, so that they, when entering into the curing liquid, will quickly be reverted into fluid pearls.

It is advantageous that, if the vessel 23 is closed, hot air or another hot gas is let in above the surface of the curing bath 24, whereby one will obtain a quick drying of the surface part of the drops in the paths 22, whereby one can increase the formation of a skin-like appearance around the drops, independently of whether this depends upon a physical or a chemical reaction or exclusively on the surface tension circumstances.

The invention, of course, is not limited to the specific form, described above and shown in the drawing, but various different modifications within the scope of this invention will be apparent to those skilled in the art.

What I claim is:

1. In a method for the production of fluid pearls, the steps comprising: feeding a pearl forming material to a rotatable body provided with orifices sized in accordance with the desired dimensions of the pearls, the orifices being inclined in a direction away from the direction of rotation of the body, rotating the body so that the pearl forming fluid is ejected from the orifices in the form of drops into an atmosphere through which they pass until they reach the surface of a curing bath located in a second vessel where the fluid pearls are cured, said drops of pearl forming material being ejected from the orifices in a direction of movement which has a component in a direction opposite to the surface rotational direction of the rotating body, and removing the cured fluid pearls from the curing bath.

2. A method as recited in claim 1 further comprising the step of rotating the liquid of the curing bath so that the surface assumes a paraboloid form.

3. A method as recited in claim 2 wherein the liquid of the curing bath is rotated in the same direction as the rotating body but at a lower rotational speed.

4. A method as recited in claim 1 further comprising heating the atmosphere through which said drops pass between said orifices and said curing bath.

References Cited by the Examiner

UNITED STATES PATENTS

| | | | |
|---|---|---|---|
| 773,614 | 11/1904 | Westaway | 264—8 |
| 1,357,206 | 10/1920 | Fuller | 264—8 |
| 1,782,038 | 11/1930 | Haak | 18—2.6 X |
| 2,816,826 | 12/1957 | Brennan | 18—2.6 X |

ROBERT F. WHITE, *Primary Examiner.*

ALEXANDER H. BRODMERKEL, *Examiner.*

C. B. HAMBURG, L. S. SQUIRES, *Assistant Examiners.*